Patented May 16, 1933

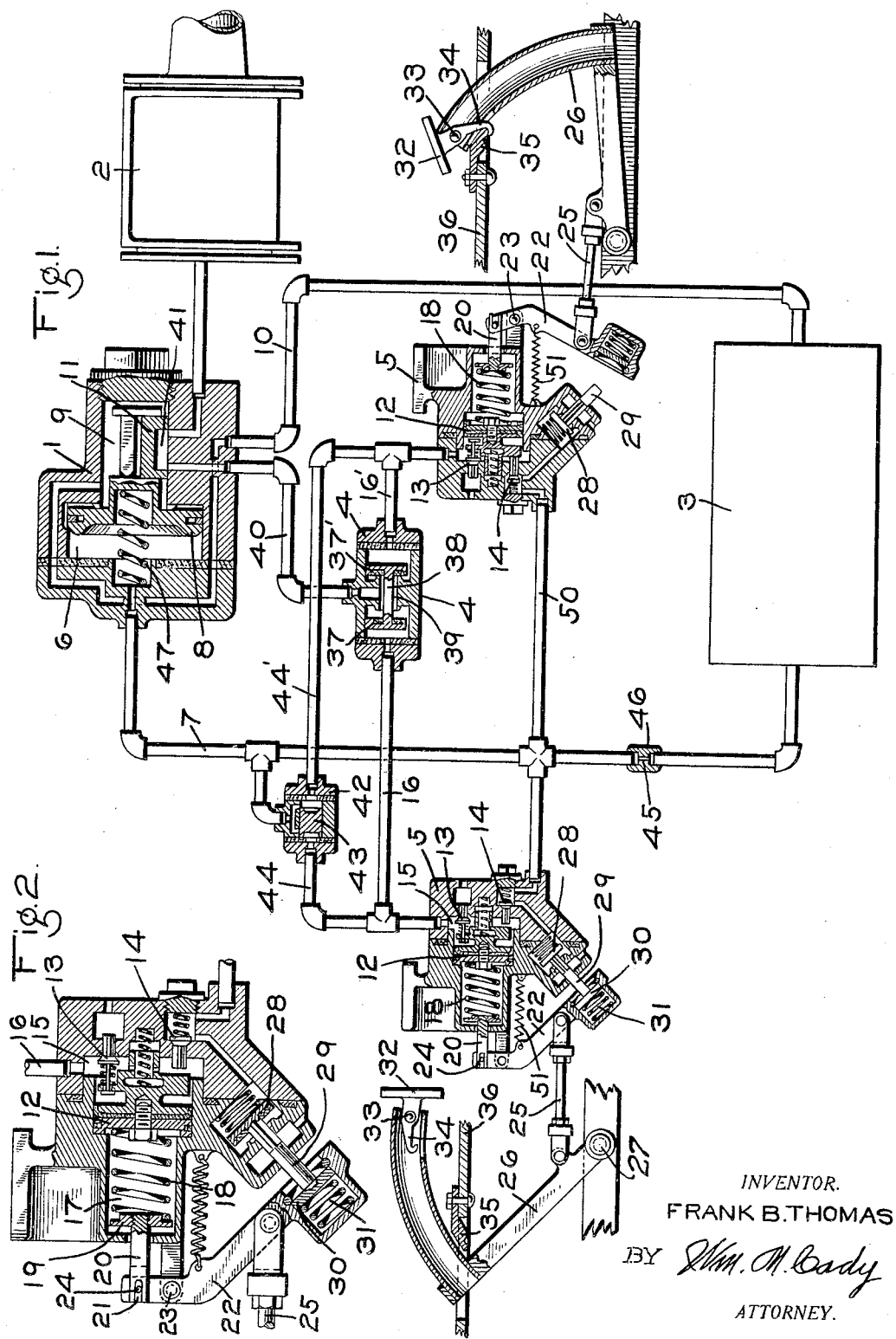

1,909,382

UNITED STATES PATENT OFFICE

FRANK B. THOMAS, OF FOREST HILLS, PENNSYLVANIA, ASSIGNOR TO THE WESTING-HOUSE AIR BRAKE COMPANY, OF WILMERDING, PENNSYLVANIA, A CORPORATION OF PENNSYLVANIA

SAFETY CONTROL EQUIPMENT

Application filed July 14, 1931. Serial No. 550,693.

This invention relates to fluid pressure brakes and more particularly to a double end equipment, in which the brakes may be controlled from either end of the car.

It has heretofore been proposed to provide a double end equipment in which the brake valve device may be left in service application position when the operator goes from one end of the car to the other. A double check valve is provided, which is operated by fluid supplied in effecting a straight air service application of the brakes at the non-operating end to establish communication through which fluid is supplied to the brake cylinder at the operating end.

If the pressure of fluid supplied to the double check valve device at the non-operating end of the car should leak down or become less than the pressure carried in the system, the double check valve may be operated by the pressure of fluid supplied at the operating end of the car to cut off communication through which fluid is supplied to the brake cylinder, before full available pressure is attained in the brake cylinder.

The principal object of my invention is to provide means for ensuring that the double check valve will be maintained in its desired operating position by fluid under pressure supplied to the double check valve at the non-operating end of the car.

In the accompanying drawing: Fig. 1 is a diagrammatic view, partly in section, of a safety control fluid pressure brake equipment embodying my invention; and Fig. 2 an enlarged sectional view of one of the manually controlled brake valve devices.

The equipment may comprise an emergency valve device 1, a brake cylinder 2, a main reservoir 3, a double check valve device 4, and a brake valve device 5 at each end of the car.

The emergency valve device 1 comprises a casing having a piston chamber 6 connected to an emergency pipe 7 and containing a piston 8 and having a valve chamber 9 connected through pipe 10 with the main reservoir 3 and containing a slide valve 11 adapted to be operated by piston 8.

Each brake valve device 5 comprises a casing having a cylindrical bore containing a piston 12 adapted to operate an exhaust valve 13 and a fluid pressure supply valve 14.

The chamber 15 at one side of the piston 12 is connected to a pipe 16 through which fluid is supplied to and released from the brake cylinder 2 and the chamber 17 at the opposite side of the piston contains a coil spring 18 which acts on said piston.

A plunger 19 engages the outer end of spring 18 and is provided with a stem 20 which extends out of the casing and has the outer end provided with a slot 21. A lever 22, pivoted on a pin 23, is provided with a pin 24 which engages in the slot 21, and the lever 22 is connected by a link rod 25, with a pedal lever 26 which is pivoted on a pin 27.

Mounted in the casing is a valve 28 having a stem 29, which extends out of the casing and which is adapted to be engaged by a plate 30 carried by the lever 22 and subject to the pressure of a spring 31.

The pedal lever 26 is provided at its outer end with a foot pad 32 pivoted on a pin 33 and provided with a locking hook 34, adapted to engage a member 35, which is secured to the vehicle floor 36, when the pedal lever is depressed to effect a full service application of the brakes, and the pad is properly rocked on the pivot pin 33.

The double check valve device 4 comprises a casing containing valves 37 and 37', connected by a stem 38. The chamber or passage 39 intermediate the valve heads 37 and 37' is connected to a pipe 40, which leads to the seat of slide valve 11 and which is connected in the normal release position of said slide valve, through a cavity 41, with the brake cylinder 2.

Another double check valve device is provided comprising a casing 42 containing a double check valve 43 which in one position, as shown in the drawing, connects pipe 7 with a pipe 44' and in the opposite position connects the emergency pipe 7 with pipe 44.

Fluid under pressure is supplied from the main reservoir 3, through a restricted supply passage 45 of a choke coupling 46 to pipe 7 and the piston chamber 6 and through pipe 10 to valve chamber 9, so that normally the fluid pressures on opposite sides of the emergency piston 8 are maintained equal, permitting the spring 47 to maintain the piston 8 and slide valve 11 in release or normal position, as shown in Fig. 1.

At the non-operating end of the car, as shown at the right of Fig. 1, the pedal lever is held depressed, the locking hook 34 engaging the member 35. This is the full service position in which the spring 18 of the brake valve device is compressed by the movement of the lever 22, said lever being rotated in a clockwise direction, when the pedal lever 26 is depressed.

The compression of spring 18 operates the piston 12 so as to effect the seating of the exhaust valve 13 and the unseating of the service supply valve 14. Fluid under pressure is then supplied from the main reservoir 3 through pipe 50 and past the valve 14 to chamber 15 and thence through pipe 16' to the double check valve device.

It will be assumed that the double check valve device is in the opposite position from that shown in the drawing, with the valve head 37 seated and the valve head 37' unseated. A clearance space is provided from one side of each valve head to the other side, so that when the valve head 37' is unseated, fluid can flow from pipe 16', past the valve head 37' to pipe 40 and thence through cavity 41 in the emergency slide valve 11 to the brake cylinder 2.

When the operator desires to leave one end of the car to go to the other, he depresses the pedal lever 26 to the full service position so as to effect a service application of the brakes and then rocks the pedal pad 32, so that the locking hook 34 engages the member 35, to hold the pedal lever 26 in the full service position, at the non-operating end of the car.

When the operator goes to the other end of the car, he rocks the pedal pad 32 so as to release the hook 34 and permit the pedal lever 26 to be moved to release position by the action of spring 51, when the operator permits upward movement of the pedal lever.

In the release position, as shown at the left of the drawing, the lever 22 is so positioned that no pressure is applied to the spring 18 and consequently the piston 12 is shifted by the fluid pressure in chamber 15 to the position shown, in which the supply valve 14 is seated and the exhaust valve 13 is unseated.

Pipe 16 is thus vented to the atmosphere, permitting the double check valve to be shifted to the position shown in the drawing, by the fluid pressure acting on the valve head 37' as supplied thereto through pipe 16', with the brake valve device at the non-operating end of the car in service position.

Fluid under pressure is thus released from the brake cylinder by way of pipe 40, past the unseated valve head 37 and through pipe 16 to chamber 15 and thence past the open exhaust valve 13 to the atmosphere.

Fluid under pressure is also vented from the left hand side of the double check valve 43, so that the double check valve 43 will be shifted to the left to the position shown in the drawing, by the fluid pressure in pipe 44'.

In the left hand position of the double check valve 43, communication is established from the emergency pipe 7 to pipe 44', so that the fluid pressure in pipe 44' will be maintained at the pressure of fluid contained in the emergency pipe 7, which is normally full main reservoir pressure.

It will now be seen that with the brake valve device at the left of the drawing being employed as the operating valve, the double check valve 4 will be maintained in its left hand position, as shown in the drawing, by main reservoir pressure acting at the right of valve head 37'.

When an application of the brakes is effected by depressing the pedal lever 26 at the left, fluid under pressure is supplied to the brake cylinder by flow past the unseated valve head 37, and the brake cylinder pressure may be increased to equal full main reservoir pressure, if desired, without causing movement of the double check valve 4 to the right, by reason of the fact that the pressure of fluid acting on the valve head 37' is maintained at full main reservoir pressure, so long as the operating end of the car is at the left, as hereinbefore described.

If the operator goes from the end of the car at the left to the right hand end, he depresses the pedal lever 26 at the left hand end and causes the pedal lever to be locked in the full service position, as described in connection with shifting from the right hand end to the left hand end of the car. Fluid under pressure is supplied to the brake cylinder past the unseated valve head 37 and also through pipe 44 to the left hand side of the double check valve 43.

At the right hand end of the car, the operator applies his foot to the pedal pad 32 and rocks same, so as to release the locking hook 34, and then permits the pedal lever 26 to rise to release position.

Fluid under pressure is then vented from the valve head 37', permitting the fluid pressure acting on the valve head 37 to shift the double check valve to the right, so that the valve head 37 seats, while the valve head 37' unseats, to permit flow from the brake cylinder through pipe 40, past the unseated valve head 37' to the pipe 16' and thence past the unseated exhaust valve 13 of the right hand brake valve device to the atmosphere.

The supply of fluid under pressure from the main reservoir to the non-operating side of the double check valve device, ensures that if for any reason, the brake valve device at the non-operating end of the car should fail to maintain the pressure on the double check valve device, the pressure will be maintained by supply from the main reservoir by way of the emergency pipe.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a double end fluid pressure brake equipment, the combination with a brake cylinder, of a brake valve device at each end of the car, a main double check valve device operated by fluid under pressure for opening communication from one brake valve device to the brake cylinder, a source of fluid under pressure, and an additional double check valve device for controlling the supply of fluid from said source to the main double check valve device.

2. In a double end fluid pressure brake equipment, the combination with a brake cylinder, of a brake valve device at each end of the car, each operable to supply fluid under presure to the brake cylinder, a main double check valve device operated by fluid under pressure supplied to one side for opening communication at the other side from one brake valve device to the brake cylinder, a source of fluid under pressure, and an additional check valve device for controlling the supply of fluid from said source to the fluid pressure side of said main double check valve device.

3. In a double end fluid pressure brake equipment, the combination with a brake cylinder, of a brake valve device at each end of the car, each comprising a chamber adapted to be connected to the brake cylinder, valves for controlling the supply and release of fluid under pressure to and from said chamber, and means for operating said valves, a double check valve device for controlling communication from said chamber to the brake cylinder and operated by fluid under pressure supplied by one brake valve device to one side for opening communication at the other side from the other brake valve device to the brake cylinder, and additional means for also supplying fluid under pressure to maintain the fluid pressure supplied to said double check valve device.

4. In a double end fluid pressure brake equipment, the combination with a brake cylinder, of a brake valve device at each end of the car, each comprising a chamber adapted to be connected to the brake cylinder, valves for controlling the supply and release of fluid under pressure to and from said chamber, and means for operating said valves, a double check valve device for controlling communication from said chamber to the brake cylinder and operated by fluid under pressure supplied by one brake valve device to one side for opening communication at the other side from the other brake valve device to the brake cylinder, an emergency brake pipe normally charged with fluid under pressure, and means for supplying fluid under pressure from said pipe to the side of said double check valve device which is supplied with fluid under pressure from the brake valve device.

5. In a double end fluid pressure brake equipment, the combination with a brake cylinder, of a brake valve device at each end of the car, each operable to supply fluid under pressure to the brake cylinder, a double check valve device operated by fluid under pressure supplied to one side for opening communication at the opposite side from one brake valve device to the brake cylinder, an emergency brake pipe normally charged with fluid under pressure, and means for maintaining the pressure of fluid supplied to the fluid pressure side of said check valve device by fluid under pressure supplied from said pipe.

6. In a double end fluid pressure brake equipment, the combination with a brake cylinder, of a brake valve device at each end of the car, a double check valve device operated by fluid under pressure supplied by one brake valve device for opening communication through which the other brake valve device supplies fluid under pressure to the brake cylinder, and means operated by the fluid pressure supplied to said check valve device for opening a communication through which fluid under pressure is supplied to the fluid pressure side of the check valve device.

In testimony whereof I have hereunto set my hand, this 9th day of July, 1931.

FRANK B. THOMAS.